United States Patent
Williams et al.

[19]

[11] Patent Number: 6,125,406
[45] Date of Patent: Sep. 26, 2000

[54] BI-DIRECTIONAL PACKING DATA DEVICE ENABLING FORWARD/REVERSE BIT SEQUENCES WITH TWO OUTPUT LATCHES

[75] Inventors: Leon C. Williams, Walworth; Yung Ran Choi, Webster, both of N.Y.

[73] Assignee: Xerox Corporation, Stamford, Conn.

[21] Appl. No.: 09/079,364

[22] Filed: May 15, 1998

[51] Int. Cl.[7] .................................................. G06F 13/00
[52] U.S. Cl. .................................. 710/5; 710/5; 710/57; 710/65; 712/300
[58] Field of Search ................................. 710/65, 66, 4, 710/9, 71, 5, 12, 30, 31, 57, 74; 708/209; 395/375; 712/300

[56] References Cited

U.S. PATENT DOCUMENTS

| | | | |
|---|---|---|---|
| 3,914,744 | 10/1975 | Brown | 340/172.5 |
| 4,345,316 | 8/1982 | Hirotani et al. | 364/900 |
| 4,636,976 | 1/1987 | Takla | 364/900 |
| 4,901,076 | 2/1990 | Askin et al. | 341/100 |
| 4,918,644 | 4/1990 | Terada et al. | 364/900 |
| 4,974,188 | 11/1990 | Dolecek | 364/784 |
| 5,008,886 | 4/1991 | Chinnaswamy et al. | 371/40.2 |
| 5,150,364 | 9/1992 | Negus | 370/112 |
| 5,327,543 | 7/1994 | Miura et al. | 395/375 |
| 5,423,010 | 6/1995 | Mizukami | 395/375 |
| 5,499,263 | 3/1996 | Schmit et al. | 370/112 |
| 5,608,738 | 3/1997 | Matsushita | 371/37.1 |
| 5,625,355 | 4/1997 | Takeno et al. | 341/67 |
| 5,638,069 | 6/1997 | Rensink et al. | 341/67 |
| 5,644,579 | 7/1997 | Sheppard | 371/22.3 |
| 5,768,546 | 6/1998 | Kwon | 395/307 |
| 5,828,906 | 10/1998 | Jeon et al. | 395/885 |
| 5,903,779 | 5/1999 | Park | 395/898 |
| 5,960,450 | 9/1999 | Lang et al. | 711/5 |
| 5,974,433 | 10/1999 | Currie | 708/252 |

OTHER PUBLICATIONS

IBM TBD Dishon et al, "Variable–length data assembler", vol. 19, No. 12, Oct. 1976, pp.1892–1895.

IBM TBD Dewar, "Data Packer", vol. 25, No. 1, Jun. 1982, pp. 265–268.

*Primary Examiner*—Thomas C. Lee
*Assistant Examiner*—Chun Cao
*Attorney, Agent, or Firm*—Oliff & Berridge, PLC

[57] ABSTRACT

The invention provides a data packing device that packs selected bits of input data into an output data. The data packing device includes a data positioner, an output latch, and output selector and a controller. The data positioner positions the bits of the input data relative to bit positions of the output latch so that the selected bits from the input data may be packed. The output latch includes a first portion and a second portion which are packed alternately in a ping-pong manner. The controller is implemented using state machines where one state machine is allocated for packing a specific number of bits selected from the input data into the output data. Thus, the controller includes a number of state machines where each state machine corresponds to one selected number of bits of the input data that may be selected to be packed. For input data in bytes, the controller includes eight state machines.

22 Claims, 9 Drawing Sheets

BI-DIRECTIONAL PACKING DATA DEVICE ENABLING FORWARD/REVERSE BIT SEQUENCES WITH TWO OUTPUT LATCHES

BACKGROUND OF THE INVENTION

1. Field of Invention

This invention relates to a low cost and efficient technique for packing data.

2. Description of Related Art

Data packing is often required when interfacing data from one device to another. For example, image data from a scanner is often output in terms of bytes per pixel where each byte represents 256 gray scale levels. This image data may be output to many other types of devices which may support fewer numbers of bits per pixel. For example, a printer may only support three bits per pixel and thus only the three most significant bits of the image data is used for the printing process. In order to reduce effective bandwidth required to transmit the image data to a device such as a printer and to conserve storage requirements, only the required number of bits per pixel of the image data are packed into output bytes for storage and transmission.

The above described data packing task is made more complex because data packing may be required for varying numbers of bits per pixel. Thus, data packing devices and methods must support many packing combinations such as 1, 2, . . . , or 8 bits per pixel packed into output bytes. Conventional multiplexing techniques is relatively costly and undesirably inefficient. Thus, new technology is required to support such demanding data packing requirements efficiently and at low cost.

SUMMARY OF THE INVENTION

The invention provides a data packing device that packs selected bits of input data into an output data. The data packing device includes a data positioner, an output latch, and output selector and a controller. The data positioner positions the bits of the input data relative to bit positions of the output latch so that the selected bits from the input data may be packed. The data positioner positions the bits of the input data so that the bits output from the data positioner appears circularly shifted when compared to the bits of the input data, i.e., the bits shifted out from one end of the data positioner is shifted in another end of the data positioner.

The output latch includes a first portion and a second portion. The selected bits of the input data are packed starting with the first portion and then into the second portion. When the first portion of the output latch are fully packed, the data in the first portion are selected by the output selector and output through an output bus. When the second portion of the output latch is fully packed, the output selector selects the data of the second portion to be output through the output bus. The first and second portions are packed alternately in a ping-pong manner.

The controller controls the data positioner and the output latches to latch the selected bits positioned by the data positioner to pack the selected bits of the input data into the output latch. The controller is implemented using state machines where one state machine is allocated for packing a specific number of bits selected from the input data into the output data. Thus, the controller includes a number of state machines where each state machine corresponds to one selected number of bits of the input data that may be selected to be packed. For input data in bytes, the controller includes eight state machines. These state machines may also be combined into one state machine when appropriate for implementation efficiency.

BRIEF DESCRIPTION OF THE DRAWINGS

The invention is described with reference to the following drawings wherein like numerals reference like elements, and wherein.

DETAILED DESCRIPTION OF PREFERRED EMBODIMENTS

Figure 1:
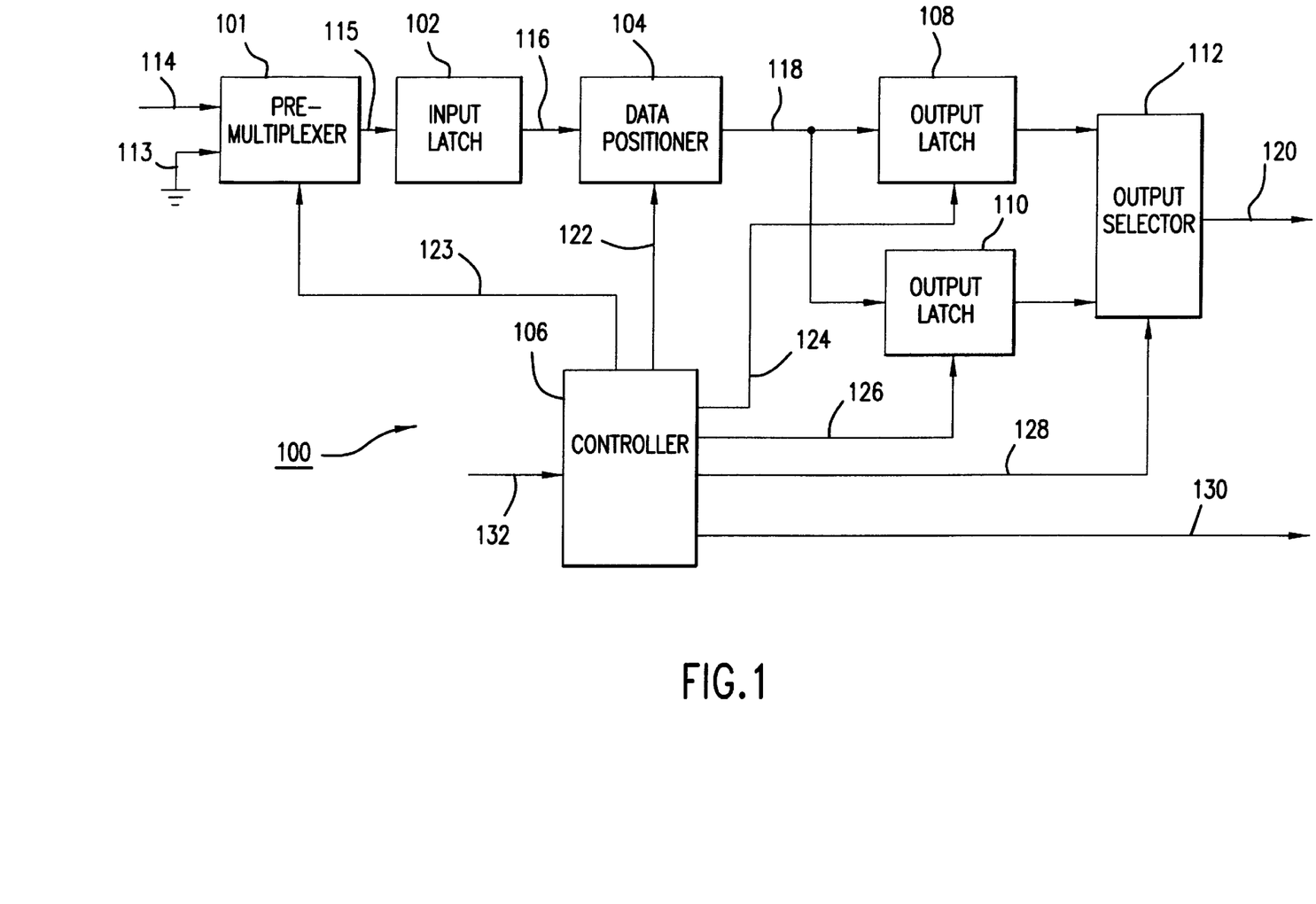
FIG. 1 is a block diagram of a data packing device.

FIG. 1 shows a block diagram of a data packing device 100 which includes a pre-multiplexer 101, an input latch 102, a data positioner 104, two output latches 108 and 110 and an output selector 112. The above components may be controlled by a controller 106.

The pre-multiplexer 101 receives input data such as image data from an external source through a first input of the pre-multiplexer 101 that is coupled to signal bus 114. The input data is output to the input latch 102 through an output of the pre-multiplexer 101. For example, if the data packing device 100 is used to pack data generated by an image scanner, the output of the image scanner is input to the input latch 102 through the signal bus 115 and the pre-multiplexer 101. The input latch 102 may be clocked by a clock signal (not shown) supplied by a larger system that incorporates the data packing device 100. After the input latch 102 latches the data received through the signal bus 115, the latched data is made available through signal bus 116 to the data positioner 104. The data positioner 104 positions the data output by the input latch 102 so that the required bits are presented to the output latches 108 and 110 through signal bus 118 in the proper packing positions. The data on the signal bus 118 are latched into the output latches 108 and 110 and the latched data are output by the output selector 112 through output signal bus 120.

The two output latches 108 and 110 are ping-pong latches where data is packed in one of the output latches 108 or 110 while data in the other output latch 108 or 110 is selected by the output selector 112 and output through output signal bus 120. The controller 106 receives control data from an external source through signal line 132 and outputs control signals to the data positioner 104 through signal bus 122, the output latches 108 and 110 through signal buses 124 and 126, and the output selector 112 through signal bus 128. The controller 106 also outputs a data valid signal through signal line 130.

Thus, as described above, data is input into the data packing device 100 through the signal bus 114 and each unit such as a byte (or 8 bits) of the input data is positioned by the data positioner 104 and packed into the output latches 108 and 110. The packed data is then output by the output selector 112 through the signal line 120.

Figure 2:
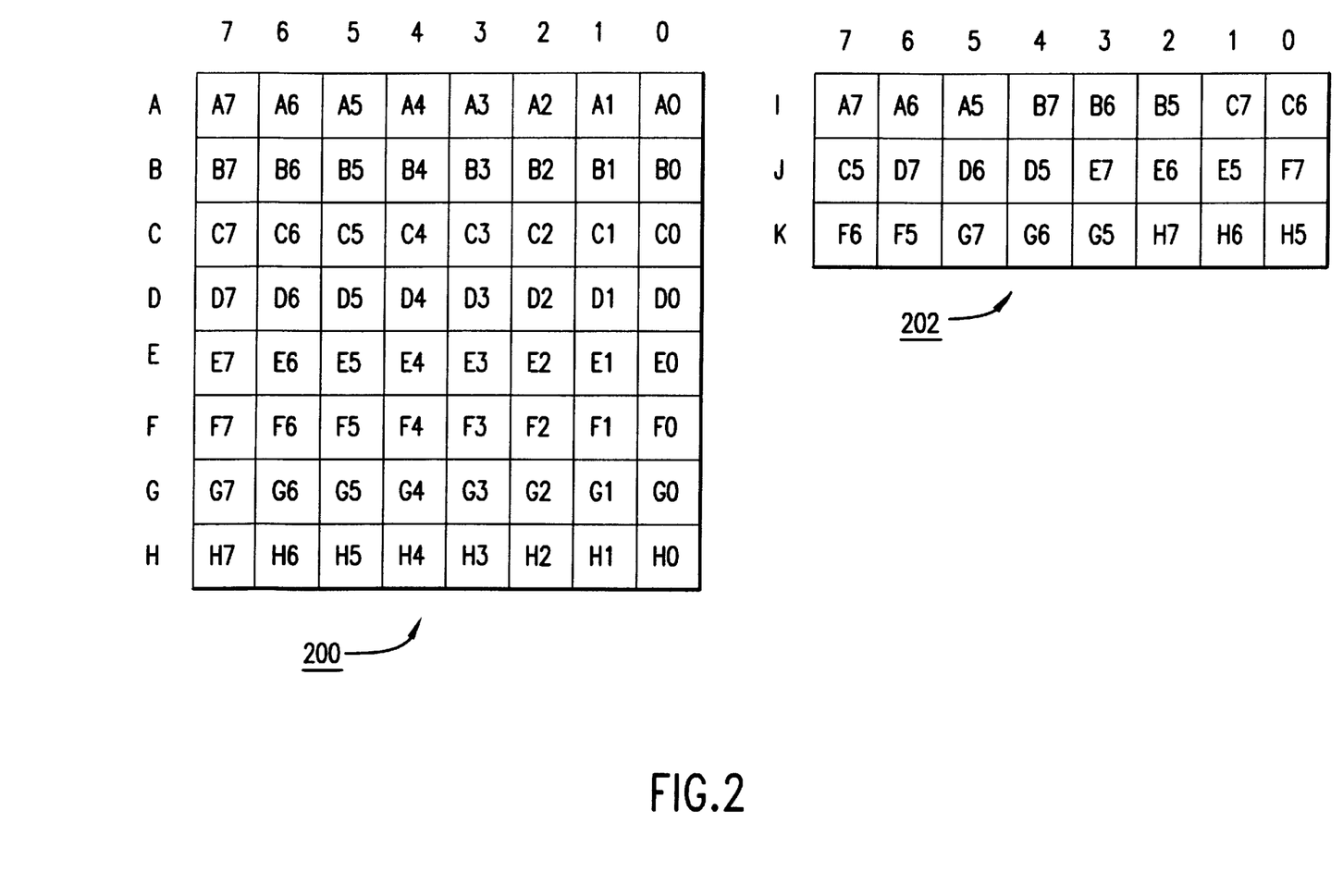
FIG. 2 shows a data packing example.

FIG. 2 shows a specific example of the data packing process. The example assumes that data is input through the signal bus 114 in bytes and the packed data is output through the signal bus 120 also in bytes. The example shows eight input bytes 200 labeled from A to H and three output bytes 202 labeled I, J and K. The numbers above the input bytes 200 and the output bytes 202 are bit numbers starting with 0 on the right being the least significant bit (LSB) up through bit 7 on the left being the most significant bit (MSB). Thus, bit 7 of byte A is labeled A7, bit 6 is labeled A6 and so on down to bit 0 labeled A0. The second byte labeled B has bits B7–B0 and so on for all the other bytes C–H and I–K.

The example shown in FIG. 2 packs the three most significant bits of the input bytes consecutively together into the output bytes 202. The three most significant bits of the A byte is packed into the most significant bit positions of the output byte I. Thus, bit positions 7, 6 and 5 of byte I has bits A7, A6 and A5. Then, the three most significant bits of the byte B are packed into the next three bit positions 4, 3 and 2 of the byte I. Thus, bits B7, B6 and B5 are stored in the bit positions 4, 3 and 2 of byte I.

At this point of the packing, only bit positions 1 and 0 remain in the I output byte which is insufficient to contain the three most significant bits of the C input byte. Thus, only the most significant two bits of the C input byte, C7 and C6 are packed into bit positions 1 and 0 of the I output byte and the remaining third most significant bit C5 of the C input byte is packed into the most significant bit position 7 of the next output byte J. Thus, the three most significant bits of the input byte C are split between the output byte I and the output byte J.

The three most significant bits of the input byte D is packed into bit positions 6, 5 and 4 of the output byte J and the three most significant bits of the input byte E is packed into bit positions 3, 2 and 1 of the output byte J. The three most significant bits of the input byte F are split between the output byte J and the output byte K where the most significant bit, F7, of the input byte F is placed in bit position 0 of the output byte J and the next two most significant bits, F6 and F5, are placed in bit positions 7 and 6 of the output byte K.

The three most significant bits of the input byte G is placed into bit positions 5, 4 and 3 of the output byte K and the three most significant bits of the input byte H is placed into bit positions 2, 1 and 0 of the output byte K. Because bit H5 is placed into the last position bit 0 of the output byte K, the three most significant bits of the following eight input bytes are placed in the following three output bytes in the same packing pattern as shown for output bytes I, J, and K.

Figure 3:
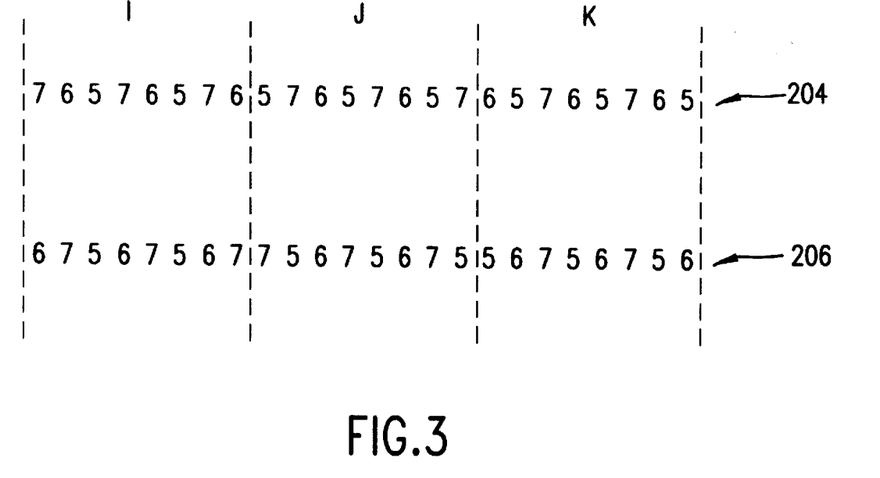
FIG. 3 shows a summary of the packing order for the example of FIG. 2.

If the input byte indications A–H are removed, the packing pattern would simply be a string of input byte position numbers such as shown in FIG. 3. The string of numbers 204 shows the packing pattern for the example shown in FIG. 2. The string 204 is simply the selected bit numbers of the packed input bytes stringed together in a single string. Eight consecutive bits of the string 204 are packed into a single output byte as indicated in FIG. 3.

The data packing device 100 may also pack the selected bits of the input bytes A–H into the output bytes I–K in a reverse order. For example, the string 206 shown in FIG. 3 is the data packing pattern for packing the three most significant bits of the input bytes in a reverse order in the output bytes as compared to the string 204. Thus, the pattern begins with the rightmost bit of the output byte I counting to the left towards the leftmost bit of the output byte I and continuing with the rightmost bit of the output byte J toward the leftmost bit of the output byte J and then continuing with the rightmost bit of the output byte K toward the leftmost bit of the output byte K. The string 206 may be obtained from the string 204 by simply reversing the order of the bit numbers for each output byte. For the remainder of the discussion, the packing order corresponding to string 204 is used as an example. However, the data packing device 100 may just as easily pack the input bits in the order corresponding to the string 206.

Figure 4:
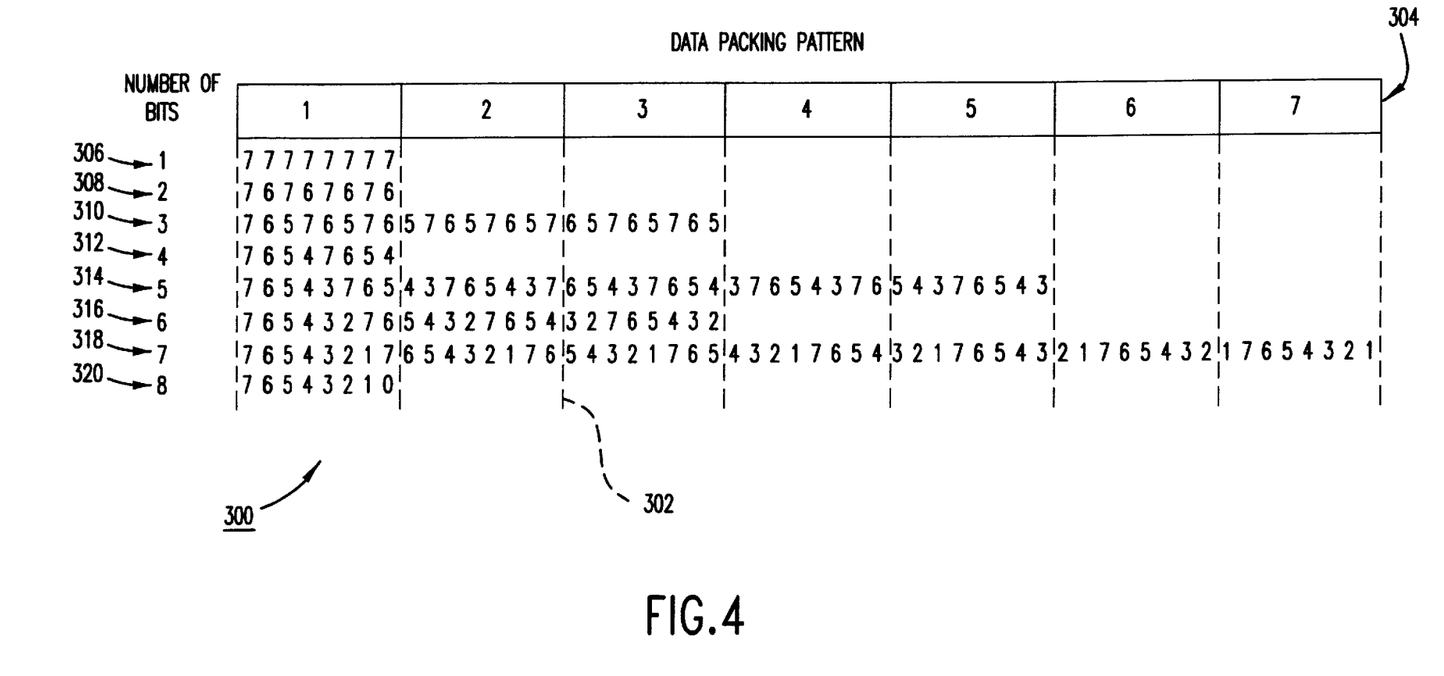
FIG. 4 shows packing orders for various number of bits packed per byte.

FIG. 4 shows data packing pattern 300 for different numbers of bits selected from the input data. On the left side of the data packing pattern 300 is shown the number of bits being selected from the input data and the top row 304 indicates the number of consecutive output bytes. The vertical dotted lines 302 indicates the byte boundaries of the output bytes.

While FIG. 4 shows the data packing pattern in terms of bytes, the output data may have units with bit lengths of any number and the input data may have units of any number of bits. For example, the input units may have 16 bits while the output units may have 8 bits and vise versa. However, for convenience of discussion, it is assumed that the input data is received in bytes and the output data is output in bytes. Thus, FIG. 4 shows that the number of bits selected from the input data ranges from 1 to 8 and the data packing pattern is blocked in 8 bit bytes.

If only the most significant bit from each of the input bytes are selected to be outputted, then each byte of the output data contains eight of the selected input bits, one bit from each byte of the input data as shown in row 306. Thus, the data packing pattern 306 is simply eight 7s (where 7 is the bit number of each input byte) packed into a single output byte corresponding to the most significant bits of each of the input data bytes. For this data packing pattern, only one of the output latches 108 or 110 are required because the data packing pattern 306 does not span over more than one byte.

When the number of bits selected from the input data is greater than one, the data packing pattern repeats after a number of output bytes that is equal to the smallest common multiple between the number of bits and 8 divided by 8. For example, the smallest common multiple between 2 and 8 is 8. Thus, the number of output bytes in which the data packing pattern repeats for two bits selected out of each input data byte is 8 divided by 8 which is 1 as shown in row 308. The same is true for four and eight bits selected out of each input data to be packed in the output data bytes as shown in rows 312 and 320. For three bits selected out of each input byte, the lowest common multiple between 3 and 8 is 24, and 24 divided by 8 is 3. Thus, three output bytes are required for the data packing pattern to repeat as shown in row 310. The same type of calculations may be made for cases where 5, 6 and 7 bits are selected out of the input data as shown in rows 314, 316 and 318.

As shown in FIG. 4, data packing patterns 306, 308, 312, and 320 do not span over more than one byte. Thus, if only these data packing patterns are needed, then only one of the output latches 108 and 110 are required and the output selector 112 is not required.

Figure 5:
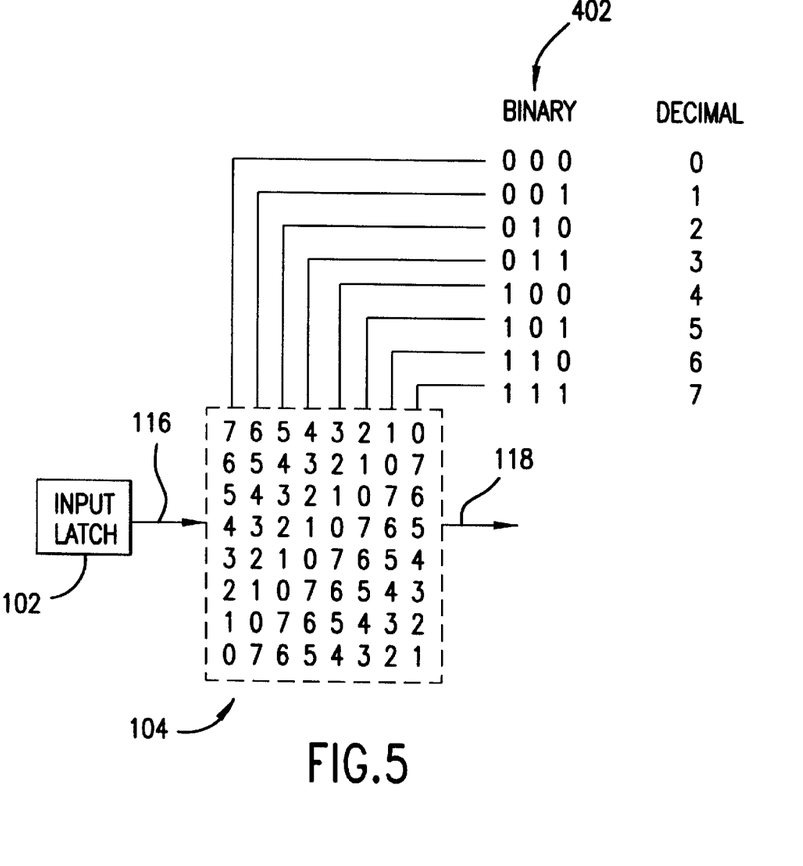
FIG. 5 shows a block diagram of a data positioner shown in FIG. 1.

FIG. 5 shows a conceptual diagram of the functions performed by the data positioner 104. The data positioner 104 essentially rotates the bits of the input data received from the signal bus 116 based on an address 402 received from the controller 106. For example, when the address 402 is binary 000, the input data is not rotated but presented at the output signal bus 118 in the order that the input data byte is received from the signal bus 116. When the address 402 is binary 001, the data positioner 104 rotates the bits of the input data by one bit shifting all the bits up by one position and bit 7 rotates from the most significant bit position to the least significant bit position. When the address 402 is binary 010 (or decimal 2), the data positioner 104 rotates the bits of the input data by two bits moving the bit pattern up two positions and the most significant bits 7 and 6 are rotated to the least significant bit positions. Thus, the bits of the input data byte is rotated by a number of bit positions indicated by the address 402 and the most significant bits are rotated around to the least significant bit positions.

The bit rotations performed by the data positioner 104 positions the selected bits from the input data byte in a desired output position. For example, the data packing pattern shown for selecting three bits from the input data is shown in row 310 of FIG. 4. Thus, for the first input byte, the address 402 of 0 is selected so that bits 7, 6, and 5 of the input byte are positioned in the output signal bus 118 at the three most significant bit positions. For the second input data, the three most significant bits 7, 6 and 5 are positioned in bit positions 4, 3 and 2 of the signal bus 118 corresponding to address 402 of 5. Finally, for the third input data, the two most significant bits 7 and 6 of the input data are positioned at bit positions 1 and 0 of the signal bus 118 corresponding to address 402 of 2.

Figure 6:
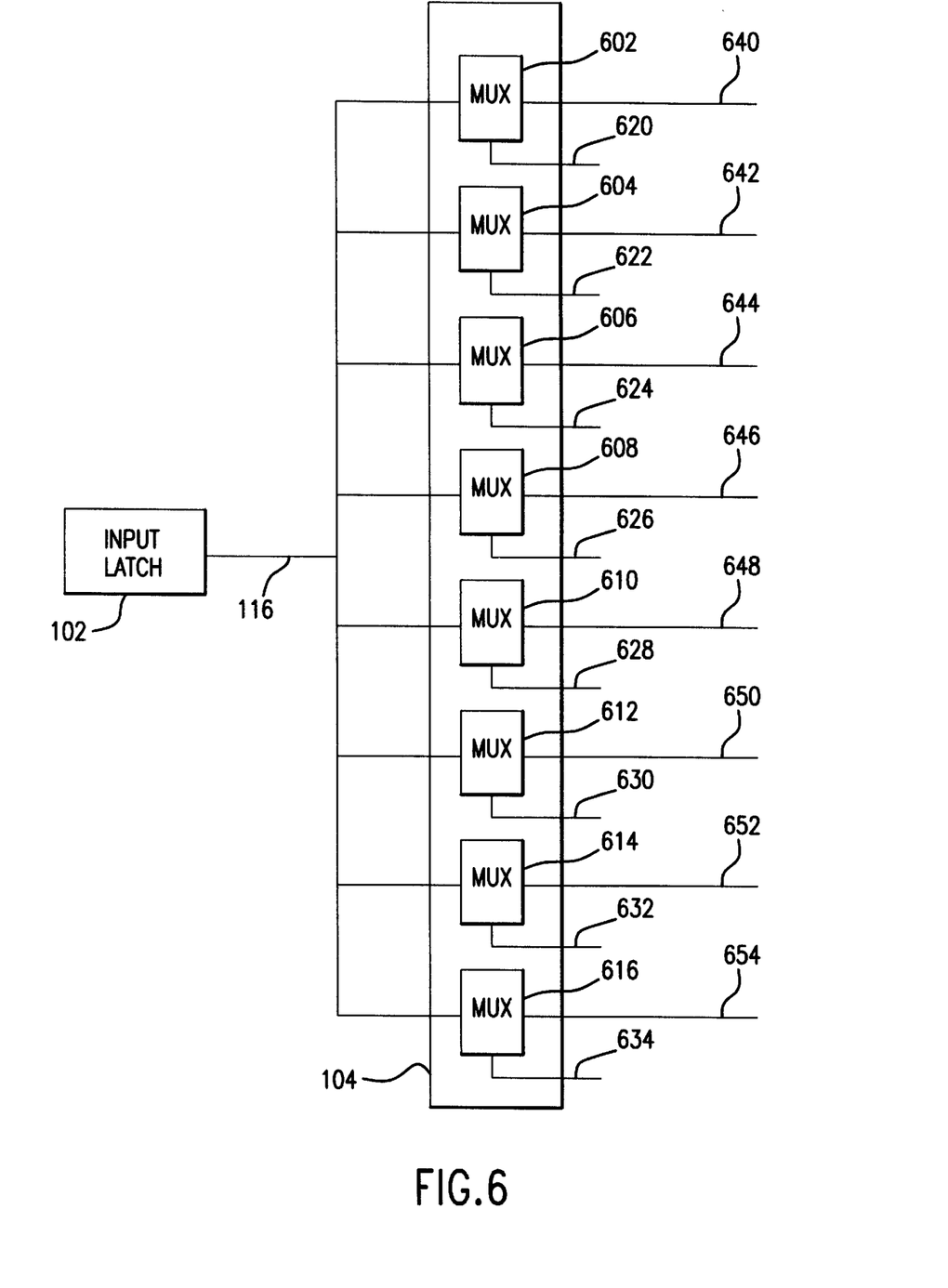
FIG. 6 shows a block diagram of an embodiment of the data positioner.

FIG. 6 shows a block diagram of an exemplary embodiment of the data positioner 104 for inputting and outputting bytes. The data positioner 104 includes eight 8 to 1 multiplexors 602–616. Each multiplexor 602–616 receives the input data bytes through the signal bus 116 and outputs a single bit through signal line 640–654. For each input data byte, the controller 106 selects one of the bits in each of the multiplexors 602–616 through control line 620–634. Thus, when the three most significant bits of each input data byte are selected to be packed, the first multiplexor 602 selects bit 7, the second multiplexor 604 selects bit 6 and the third multiplexor 606 selects bit 5 for the first input data byte.

Figure 7:
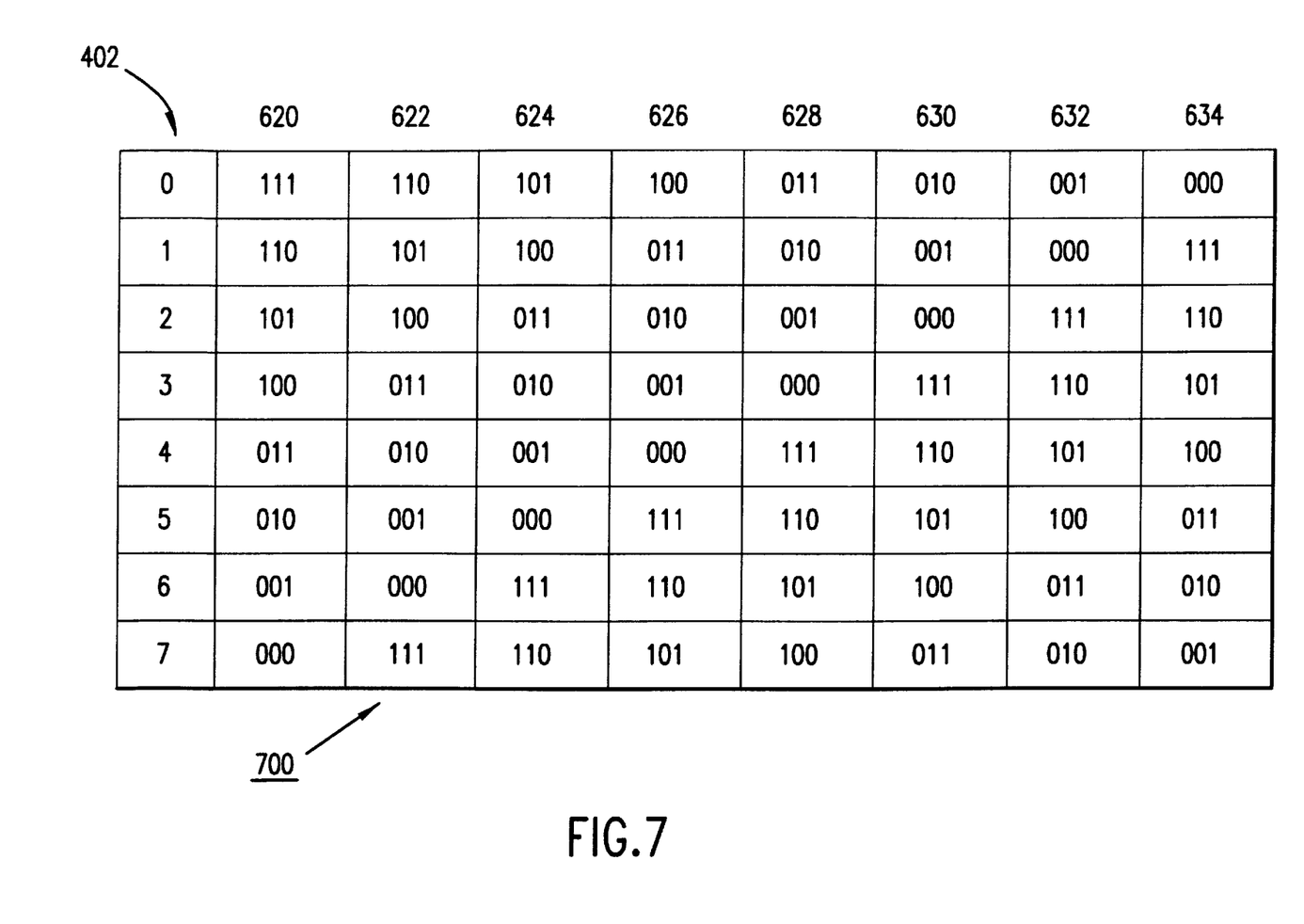
FIG. 7 shows control data output by the data positioner.

FIG. 7 shows examples of control signals 700 generated by the controller 106 on the control lines 620–634 for the multiplexors 602–616. The left column corresponds to the address 402 as shown in FIG. 5. For address 402 of 0, the input data bit pattern is output directly to the signal bus 118 without rotating the bits of the input data. Thus, for address 402 of 0, the multiplexor 602 selects bit 7 and the controller 106 outputs a binary 111 (decimal 7) to the control line 620. Similarly, the multiplexor 604 selects bit 6 and the controller 106 outputs binary 110 (decimal 6) to the control line 622, etc. for all the remaining multiplexors 606–616 and corresponding control lines 624–634, as shown in FIG. 7.

For address 402 of 1, the multiplexor 602 selects bit 6 as shown in FIG. 5. Thus, the controller 106 outputs binary 110 (decimal 6) to control line 620; binary 110 (decimal 5) to control line 622, and so on for the other control lines 624–634 as shown in FIG. 7. In the same manner, the controller generates the control line signals for the control lines 620–634 corresponding to each of the addresses 402.

Figure 8:
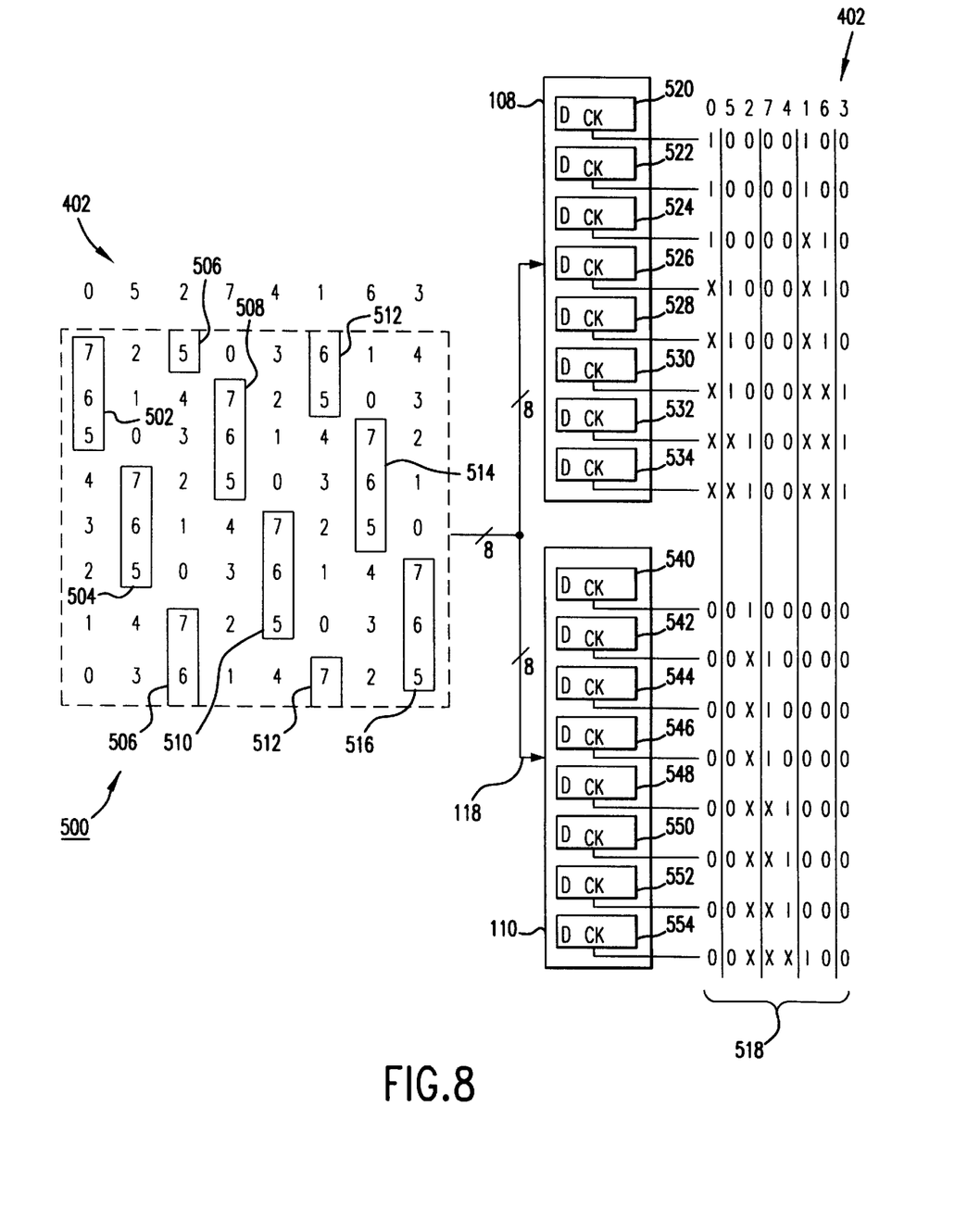
FIG. 8 shows a block diagram of output latches of FIG. 1.

FIG. 8 shows a block diagram of an exemplary embodiment of the output latches 108 and 110 for outputting bytes. The output latches 108 and 110 each includes eight D-type latches where the D input is connected to the corresponding bit of the data on the signal bus 118. For example, the D input of D latch 520 is connected to the most significant bit 7 of the data on the signal bus 118; the D input of the D latch 522 is connected to the second most significant bit 6 of the data on the signal bus 118; etc. Similarly, the D input of the D latch 540 of the output latch 110 is connected to the most significant bit 7 of the data on the signal bus 118; the D input of the D latch 542 is connected to the second most significant bit 6 of the data on the 6 signal bus 118; etc.

When the three most significant bits of the input data byte is selected to be packed into output data bytes, the input data byte is output by the data positioner 104 on the signal bus 118 as shown by block 500 in the order from left to right. The first column in block 500 is output on the signal bus 118 first and then the second column is output next and so on until the last column is output on the signal bus 118. The first column corresponds to the address 402 of 0 and the second column corresponds to the address 402 of 5 and so on as indicated by the row of numbers above the block 500.

Within the block 500 are subblocks 502–516 indicating the three most significant bits that are selected to be packed in the output data bytes. Thus, the three most significant bits of the first input data byte are enclosed by block 502 and the three most significant bits of the second input data byte are enclosed by block 504, for example. As shown by the block 500, the first input data byte is rotated by 0 bits while the second input data byte is rotated by 5 bits. Thus, the blocks 502 and 504 are positioned in the proper position to be latched into the output latches 108 and 110.

The third column of the block 500 shows that the three most significant bits enclosed by subblock 506 are split between two least significant bits and one most significant bit of the data output on the signal bus 118. The controller 106 controls the clock signals of the output latches 108 and 110 to latch bits 7 and 6 into D latches 532 and 534 and to latch bit 5 in D latch 540. Thus, by controlling the clock inputs of the D latches 520–554, the controller 106 selects the appropriate bits output by the data positioner 104 on the signal bus 118 for packing into the output latch 108 and 110.

As discussed above, the controller 106 determines which of the D latches 520–554 receives the data that is placed at the corresponding D inputs. The clock signals 518 shown at the right side of FIG. 8 correspond to the address 402 generated by the controller 106. A clock signal of 1 latches the D input into the D latch, a clock signal of 0 does not latch the D input into the D latch, and an "x" indicates a don't care.

As shown by the clock signals 518, for address 402 of 0, D latches 520, 522 and 524 latch the data. Thus, input data bits 7, 6 and 5 are latched into the D latches 520, 522 and 524. For address 402 of 5, the clock inputs for D latches 520, 522 and 524 are 0s while the clock inputs for D latches 526, 528 and 530 are 1s. Thus, the input data bits 7, 6, and 5 of the second input data is latched into D latches 526, 528 and 530 while the data that was latched into D latches 520, 522 and 524 remain undisturbed. For the address 402 of 2, the input data bits 7 and 6 are latched into D latches 532 and 534 while the input data bit 5 is latched into D latch 540 of the output latch 110.

After the third input data byte, the output latch 108 contains valid output data, and the output selector 112 selects the data of the output latch 108 to be placed on the output signal bus 120. The output data in the output latch 108 remains valid until the sixth input data byte. At this time, the address 402 is 1 and the selected bits of the input data byte is latched into both the output latches 108 and 110. Thus, during the time corresponding to the fourth and fifth input data bytes, the data in the output latch 108 is valid. During this time, the output valid signal is set to a 1 indicating that the signal output on the output signal bus 120 is valid.

The data in the output latch 110 is latched as shown in FIG. 8 and is valid during the seventh through the tenth input data bytes corresponding to address 402 of 6, 3, 0 and 5. Thus, during this time the output valid signal is also 1 and the data of the output latch 110 is placed on the output signal bus 120. The output valid signal is 0 at other times indicating that the data on the output signal bus 120 is invalid.

Figure 9:
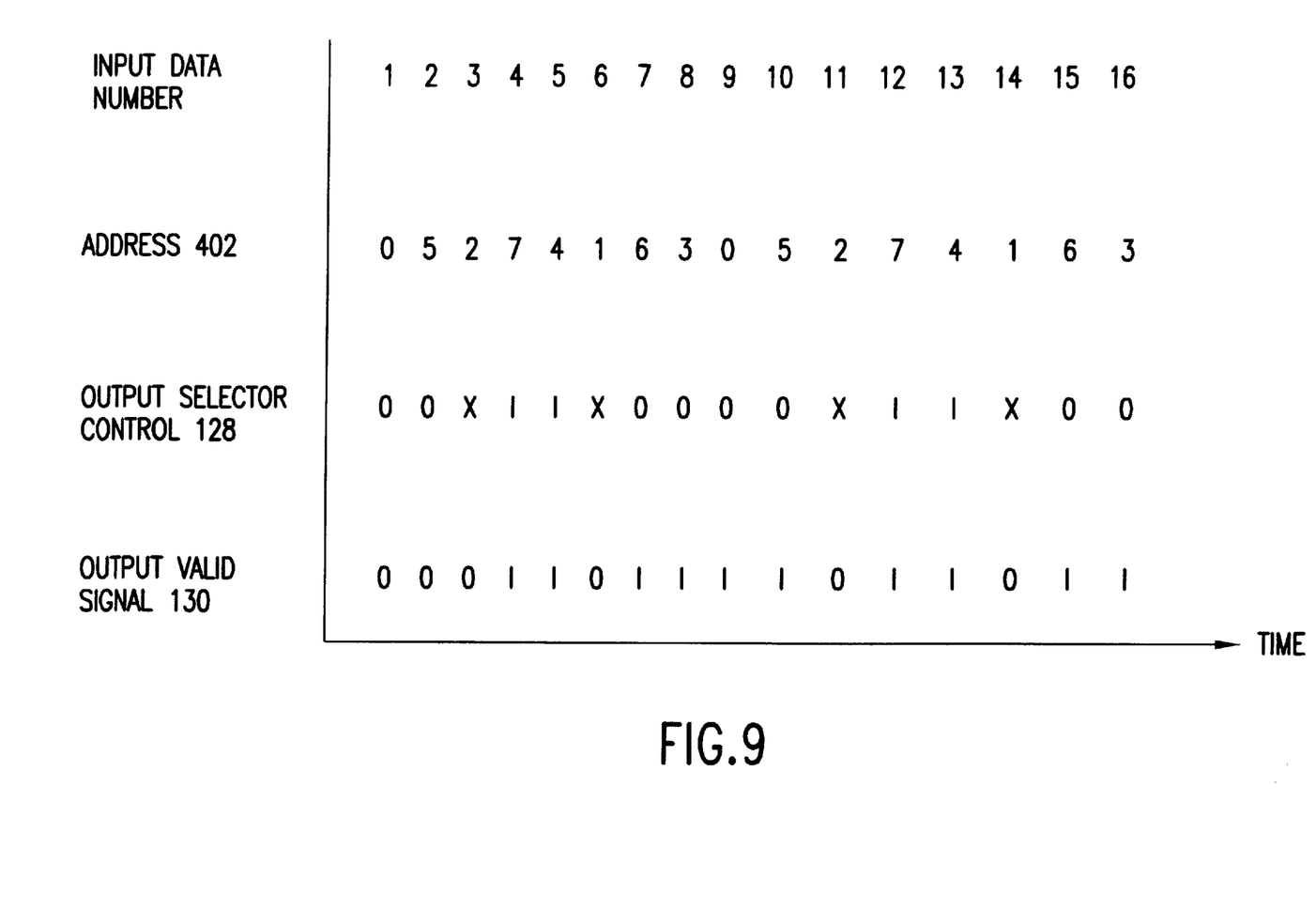
FIG. 9 shows a timing diagram of signals generated by a controller shown in FIG. 1.

The relative timing of the address 402, the output selector control on signal bus 128, and the output valid signal on signal line 130 is shown in FIG. 9. In FIG. 9, time progresses from left to right as indicated by the input data byte number 1 to 16. Corresponding to input data byte number 1, the address 402 is 0; corresponding to input data byte number 2, the address 402 is 5; and so on as shown in FIG. 9. The address 402 forms a pattern that repeats after the eighth input data byte number. Thus, the data packing pattern repeats after eight input bytes as shown in FIG. 2. The output selector control 128 selects either the output latch 108 or the output latch 110 for output to the signal bus 120. An output selector control value of 0 corresponds to the output latch 110, an output selector control value of 1 corresponds to the output latch 108, and an "x" is a don't care.

The output valid signal 130 is output by the controller 106 to indicate when the data on the output signal bus 120 is valid. The output is invalid during input data byte numbers 1, 2 and 3 because the data has not yet been packed in either one of the output latches 108 or 110. At input data byte number 4, the data in the output latch 108 is fully packed and ready for output as indicated by the output valid signal 130. The data in the output latch 108 remains valid until input data byte number 6.

When the input data byte number 6 is valid, bits 6 and 5 are latched into D latches 520 and 522 as shown in FIG. 8. Thus, during this time the data in output latch 108 is invalid as indicated by the output valid signal 130 being 0. The data in output latch 110 becomes valid at input data byte number 7 through input data byte number 10. Thus, the output valid signal 130 is a 1 during this time. However, at input data byte number 11, bit 5 of the input data byte is latched into D latch 540 and thus the data in the output latch 110 becomes invalid as indicated by the output valid signal 130 being 0.

The controller 106 generates the address 402, the output selector control 128 and the output valid signal 130 using state machines, one state machine for each output packing pattern. For input and output data in bytes as shown in FIG. 4, the controller 106 has one state machine corresponding to each data packing pattern 306–320. For other input and output lengths such as 16 bit inputs and 8 bit byte outputs or 8 bit byte inputs and 16 bit outputs, data packing patterns other than what is shown in FIG. 4 may result. For these other cases, the controller 106 would also include one state machine corresponding to each data packing pattern.

While the above discussion indicates one state machine is needed for each data packing pattern, these state machines may be combined into one state machine and optimized appropriately. Of course, other control methods are possible such as a micro-controller executing microcode to perform similar functions. This is especially attractive if a micro-controller is required for other functions unrelated to the data packing needs.

Figure 10:
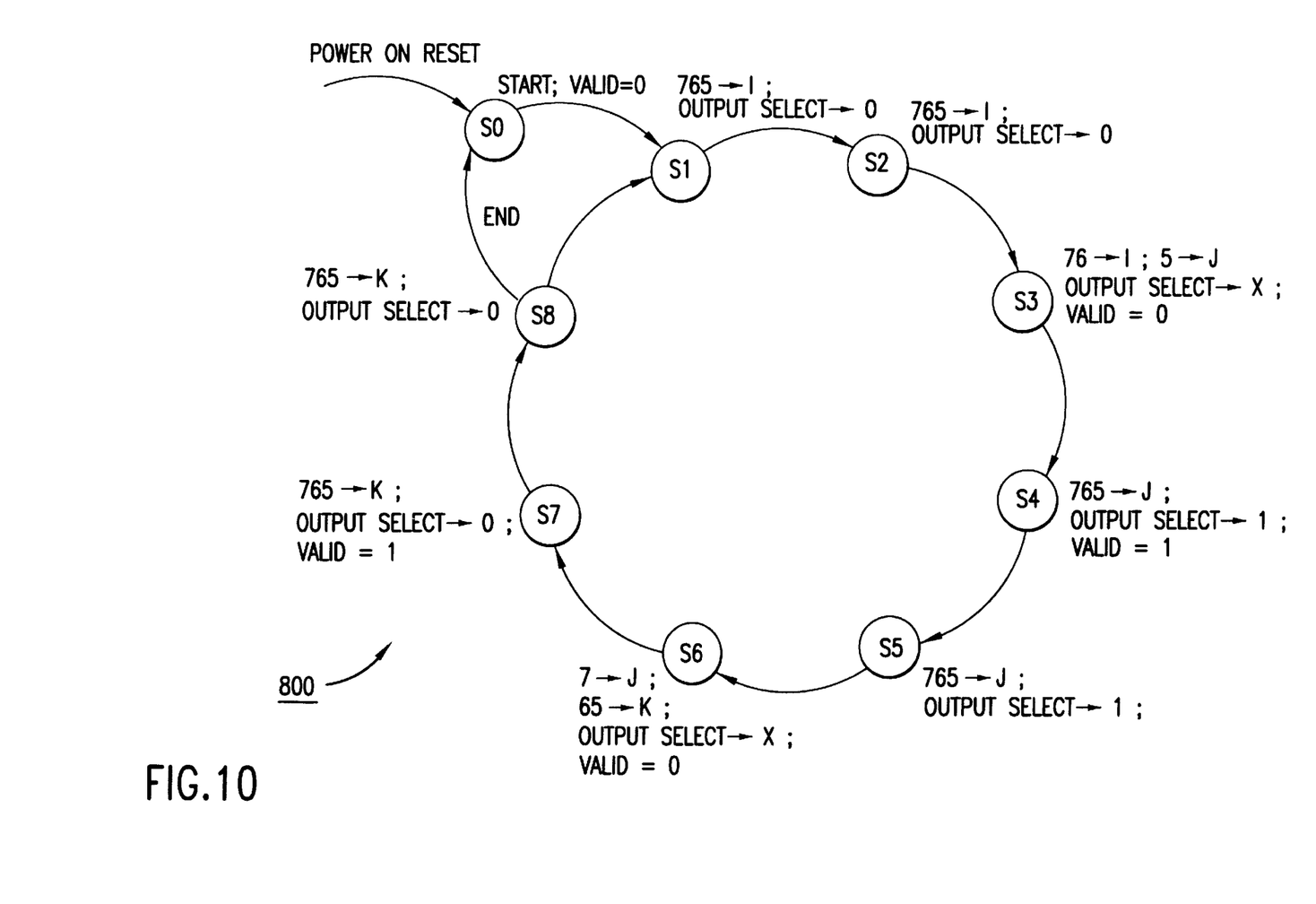
FIG. 10 shows an example of a state machine implementing the functions of the controller.

For the data packing pattern 310 of FIG. 4, the controller 106 generates the address 402, the output selector control 128, and the output valid signal 130 based on an exemplary state machine 800 as shown in FIG. 10. State S0 is entered when the data packing device 100 is powered on and receive a power-on-reset signal. The state machine 800 remains at state S0 until a start signal is received and the state machine 800 transitions to state S1 setting a valid bit to 0. The valid bit is output during each state as the output valid signal. In state S1, the controller 106 controls the data positioner 104 and the clock signals of the output latches 108 and 110 to store input data bits 7, 6 and 5 of the first input data byte A into the output latch 108 corresponding to the first output byte I as shown in FIG. 2. The controller 106 also sets the output selector control signal on signal bus 128 to 0. The state machine 800 transitions to state S2 when the second input data byte is received.

In state S2, the controller 106 latches the input data bits 7, 6 and 5 of the input byte B into data latches 526, 528 and 530 and continues to set the output selector control on signal bus 128 to 0. The state machine 800 transitions to state S3 when input data byte C is received. During state S3, the controller 106 latches input data bits 7 and 6 into D latches 532 and 534 corresponding to output byte I and bit 5 into D latch 540 corresponding to output byte J. The output select control on signal bus 128 is set to a don't care value and the valid bit is set to 0.

When input data byte D is received, the state machine 800 transitions to state S4. In state S4, the controller 106 latches input data bits 7, 6 and 5 of input data byte D into D latches 542, 544 and 546; sets the output select control signal on signal bus 128 to 1 indicating that data in output latch 108 is ready for output and sets the valid bit to 1. The state machine 800 transitions to state S5 when input data byte E is received. In state S5, the controller 106 latches input data bits 7, 6 and 5 of input data byte E into D latches 548, 550 and 552 and continues to set the output select control signal on signal bus 128 to 1.

When the input data byte F is received, the state machine 800 transitions to a state S6. In state S6, the controller 106 latches bit 7 of the input data byte F into D latch 554; latches input data bits 6 and 5 of the input data byte F into D latches 520 and 522; sets the output select signal on signal bus 128 to don't care; and sets the valid bit equal to 0. The state machine 800 transitions to state S7 when input data byte G is received. In state S7, the controller 106 latches input data bits 7, 6 and 5 of input data byte G into D latches 524, 526 and 528; sets the output select control signal on signal bus 128 to 0 and sets the data valid bit to 1. The state machine 800 transitions to state S8 when input data byte H is received. In state S8, the controller 106 latches input data bits 7, 6 and 5 into D latches 530, 532 and 534; and sets the output select control signal on signal bus 128 to 0. In state 8, if an end signal is received, the state machine 800 transitions back to state S0. However, if a next input data byte is received, the state machine 800 transitions to state S1 and repeats the above-described process.

The state machine 800 is used to control the data positioning and output data packing for selecting the three most significant bits of an input byte and packing them into output bytes. The controller 106 includes other state machines corresponding to each of the other data packing patterns that was shown in FIG. 4. Thus, the controller 106 includes eight state machines for input data and output data in bytes where each state machine controls the data positioner 104, output latches 108 and 110, the output selector 112 and the output valid signal on signal line 130 corresponding to each of the data packing patterns shown in FIG. 4.

If the number of pixels of the input data received through the signal bus 114 is not an integer multiple of the output latch size such as a byte, for example, then the last byte output by the data packing device 100 is only partially packed. In this case, the pre-multiplexer 101 may be used to switch data output to the input latch 102 from data received through the first input to data received from a second input of the pre-multiplexer 101. The second input of the pre-multiplexer 101 may be grounded or receive preset data from the external source, for example.

When the data input through the signal bus 114 is exhausted, the state machine 800 controls the pre-multiplexer 101 through signal bus 123 to switch from the first input to the second input so that the data output from the pre-multiplexer 101 to the input latch 102 is the preset data or 0s is the second input in grounded. Other schemes may also be used to account for this problem of filling the last output byte such as resetting the output latches 108 and 110 before packing new data so that when the last input data is packed, the unpacked bits would already be 0s. The pre-multiplexer 101 may be deleted when other solutions for this problem are used such as resetting the output latches 108 and 110.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A data packing device packing input data into output data, comprising:

a data positioner;

an output latch coupled to the data positioner;

a controller coupled to the data positioner and the output latch, the controller controlling the data positioner to position bits of the input data in a forward order or a reverse order in a position relative to bits of the output latch, and controlling the output latch to receive positioned bits from the data positioner and to latch either selected bits of the input data into the output data; and an output select or coupled to the output latch, the output latch having two portions and the output selector selecting data of one of the two portions for outputting as the output data based on the control signals received from the controller.

2. The device of claim 1, wherein the input data includes a plurality of input units and the output data includes a plurality of output units, the controller receiving an external signal that selects a number of a plurality of numbers of bits of each of the input units to be packed into the output units, the controller controlling the data positioner and the output latch to pack the selected number of bits from each of the input units into the output units.

3. The device of claim 2, wherein the positioned bits output by the data positioner are the bits of each of the input units circularly shifted by an integer multiple of a number of bit positions equal to the number of bits of each of the input units selected to be packed, bits shifted out at one end of the data positioner being shifted in at another end of the data positioner.

4. The device of claim 2, wherein the data positioner comprises a plurality of multiplexers, each of the multiplexers having inputs and each of the inputs corresponding to one of the bits of the input unit, each of the multiplexers outputting one of the bits of the input unit selected based on a portion of the first control signals.

5. The device of claim 2, wherein the output latch comprises a plurality of latches and the latches are divided into a first group of latches and a second group of latches, the first and the second groups having a number of latches equal to a number of bits of each of the output units, each of the first and the second groups receiving the positioned input unit bits from the data positioner and latching bits of the positioned input unit bits based on respective portions of the second control signals.

6. The device of claim 2, wherein the controller comprises a plurality of state machines, each of the state machines corresponding to one of the plurality of numbers of the bits of each of the input units, each of the state machines generating first control signals and second control signals that control the data positioner and the output latch, respectively.

7. The device of claim 6. wherein at least one of most significant bits of each of the input units are selected for packing, each of the state machines packing the selected most significant bits of consecutive input units to be adjacent to each other in sequential order in consecutive output units.

8. The device of claim 7, wherein the selected most significant bits of the consecutive input units are packed in the consecutive output units in a direction either from left to right or from right to left.

9. The device of claim 7, wherein the selected most significant bits are packed into the consecutive output units without regard to output unit boundaries, a portion of the selected number of the most significant bits of the consecutive input units being packed across the output unit boundaries.

10. The device of claim 2, wherein a number of bits in each of the input units is equal to a number of bits in each of the output units.

11. The device of claim 10, wherein the number of bits in each of the input and output units is eight, the number of the plurality of numbers is eight, and the numbers range between one and eight.

12. A method for packing input data into output data, comprising:

controlling a data positioner to position bits of the input data in a position relative to bits of the output latch from either a most important bit to a least important bit or the least important bit to the most important bit;

controlling the output latch to receive positioned bits from the data positioner and to latch selected bits of the input data into the output data; and selecting one of two portions of the output latch as the output data based on the control signals received from the controller.

13. The method of claim 12, wherein the input data includes a plurality of input units and the output data includes a plurality of output units, a controller receiving an external signal that selects a number of a plurality of numbers of bits of each of the input units to be packed into the output units, the controller controlling the data positioner and the output latch to pack the selected number of bits from each of the input units into the output units.

14. The method of claim 13, wherein the positioned bits output by the data positioner are the bits of each of the input units circularly shifted by an integer multiple of a number of bit positions equal to the number of bits of each of the input units selected to be packed, bits shifted out at one end of the data positioner being shifted in at another end of the data positioner.

15. The method of claim 13, wherein the data positioner comprises a plurality of multiplexers, each of the multiplexers having inputs and each of the inputs corresponding to one of the bits of the input unit, each of the multiplexers outputting one of the bits of the input unit selected based on a portion of the first control signals.

16. The method of claim 13, wherein the output latch comprises a plurality of latches and the latches are divided into a first group of latches and a second group of latches, the first and the second groups having a number of latches equal to a number of bits of each of the output units, each of the first and the second groups receiving the positioned input unit bits from the data positioner and latching bits of the positioned input unit bits based on respective portions of the second control signals.

17. The method of claim 13, wherein the controller comprises a plurality of state machines, each of the state machines corresponding to one of the plurality of numbers of the bits of each of the input units, each of the state machines generating first control signals and second control signals that control the data positioner and the output latch, respectively.

18. The method of claim 17, wherein at least one of most significant bits of each of the input units are selected for packing, each of the state machines packing the selected most significant bits of consecutive input units to be adjacent to each other in sequential order in consecutive output units.

19. The method of claim 18, wherein the selected most significant bits of the consecutive input units are packed in the consecutive output units in a direction either from left to right or from right to left.

20. The data packing device of claim 1, wherein the controller is a state machine.

21. The data packing device of claim 1, wherein the output latch can receive positioned bits from either a first bit to a last bit or the last bit to the first bit.

22. The method of claim 12, wherein the output latch is controlled to receive positioned bits from either a first bit to a last bit or the last bit to the first bit.

* * * * *